United States Patent
Zhou et al.

(10) Patent No.: US 10,084,547 B2
(45) Date of Patent: Sep. 25, 2018

(54) IN-BAND OPTICAL INTERFERENCE MITIGATION FOR DIRECT-DETECTION OPTICAL COMMUNICATION SYSTEMS

(71) Applicant: Google LLC, Mountain View, CA (US)

(72) Inventors: Xiang Zhou, Sunnyvale, CA (US); Ryohei Urata, San Carlos, CA (US); Erji Mao, San Jose, CA (US); Hong Liu, Palo Alto, CA (US); Christopher Lyle Johnson, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/914,583

(22) Filed: Mar. 7, 2018

(65) Prior Publication Data

US 2018/0198533 A1     Jul. 12, 2018

Related U.S. Application Data

(62) Division of application No. 14/991,826, filed on Jan. 8, 2016, now Pat. No. 9,998,235.

(51) Int. Cl.
    *H04B 10/00*     (2013.01)
    *H04B 10/69*     (2013.01)

(52) U.S. Cl.
    CPC ................. *H04B 10/6971* (2013.01)

(58) Field of Classification Search
    CPC .............................................. H04B 10/6971
(Continued)

(56) References Cited

U.S. PATENT DOCUMENTS

| 5,796,725 A | 8/1998 | Muraoka |
| 7,415,206 B1 | 8/2008 | Birk et al. |

(Continued)

FOREIGN PATENT DOCUMENTS

| JP | 2002094466 A | 3/2002 |
| WO | 2015043431 A1 | 4/2015 |

OTHER PUBLICATIONS

Combined Search and Examination Report dated Jun. 26, 2017 in United Kingdom Patent Application No. 1622378.6.
(Continued)

*Primary Examiner* — Amritbir Sandhu
(74) *Attorney, Agent, or Firm* — McDermott Will & Emery LLP

(57) ABSTRACT

This disclosure provides systems, methods, and apparatus for mitigating the effects of interference signals on optical signals received at a direct-detection optical receivers. The optical receivers are capable of attenuating interference noise signals resulting from the interference between a transmitted optical signal transmitted from a transmitter to the optical receiver and one or more additional signals received at the optical receiver. The interference can be due to multi-path interference or due to in-band interference. The receivers include a tunable filter for filtering the received optical signal to remove the interference. A frequency offset module processes the received optical signal to determine a frequency offset indicative of the difference between the carrier frequencies of a modulated optical signal and an interference optical signal. The offset frequency and a bandwidth determined by the frequency offset module can be used to adjust the tunable filter to remove the interference signal from the received signal.

18 Claims, 8 Drawing Sheets

(58) Field of Classification Search
USPC .............. 398/182, 183, 195, 196, 197, 198
See application file for complete search history.

(56) References Cited

U.S. PATENT DOCUMENTS

| | | | |
|---|---|---|---|
| 8,374,210 B2 | 2/2013 | Kapoor et al. | |
| 8,611,759 B1 | 12/2013 | Kvavle et al. | |
| 8,744,278 B2 | 6/2014 | Oda et al. | |
| 9,246,587 B2 | 1/2016 | Bliss et al. | |
| 9,287,933 B2 | 3/2016 | Yu et al. | |
| 9,287,993 B1 | 3/2016 | Adleman et al. | |
| 9,611,759 B2 | 4/2017 | Adaickalasamy et al. | |
| 9,871,583 B1* | 1/2018 | Wang | H04B 10/0795 |
| 9,960,857 B2* | 5/2018 | Zhou | H04B 10/6165 |
| 2002/0089724 A1* | 7/2002 | Nishimoto | H04B 10/25133 |
| | | | 398/158 |
| 2004/0114939 A1 | 6/2004 | Taylor | |
| 2005/0058457 A1* | 3/2005 | MacDougall | H04B 10/2513 |
| | | | 398/149 |
| 2006/0013597 A1* | 1/2006 | Crivelli | H04B 10/6971 |
| | | | 398/208 |
| 2006/0034614 A1* | 2/2006 | Chen | H04B 10/2513 |
| | | | 398/149 |
| 2008/0152363 A1 | 6/2008 | Koc | |
| 2009/0116851 A1 | 5/2009 | Heffner et al. | |
| 2009/0245815 A1* | 10/2009 | Zhang | H04B 10/61 |
| | | | 398/208 |
| 2010/0239260 A1* | 9/2010 | Oikawa | H04B 10/07953 |
| | | | 398/81 |
| 2010/0239270 A1* | 9/2010 | Li | H04B 10/2507 |
| | | | 398/208 |
| 2010/0296819 A1* | 11/2010 | Kahn | H04B 10/60 |
| | | | 398/158 |
| 2012/0155890 A1 | 6/2012 | Zhou et al. | |
| 2012/0177383 A1 | 7/2012 | Tanimura et al. | |
| 2012/0189322 A1 | 7/2012 | Mo et al. | |
| 2012/0189324 A1 | 7/2012 | Mo et al. | |
| 2012/0237204 A1* | 9/2012 | Zhou | H04B 10/0795 |
| | | | 398/25 |
| 2013/0089342 A1 | 4/2013 | Oveis Gharan et al. | |
| 2013/0221211 A1 | 8/2013 | Witzens | |
| 2013/0308960 A1* | 11/2013 | Horikoshi | H03H 21/0012 |
| | | | 398/209 |
| 2014/0169784 A1 | 6/2014 | Zhou | |
| 2014/0308046 A1 | 10/2014 | Bliss et al. | |
| 2014/0369689 A1 | 12/2014 | Gadkari et al. | |
| 2015/0063818 A1 | 3/2015 | Zhou | |
| 2015/0125150 A1* | 5/2015 | Sugitani | H04B 10/614 |
| | | | 398/65 |
| 2015/0311982 A1 | 10/2015 | Georgas et al. | |
| 2016/0020857 A1 | 1/2016 | Jia et al. | |
| 2016/0065312 A1* | 3/2016 | Oyama | H04B 10/2543 |
| | | | 398/194 |
| 2016/0065313 A1 | 3/2016 | Yu et al. | |
| 2016/0248500 A1* | 8/2016 | Okabe | H04L 27/2647 |
| 2017/0180170 A1 | 6/2017 | Purushothaman et al. | |
| 2017/0201330 A1* | 7/2017 | Zhou | H04B 10/6971 |
| 2017/0214468 A1* | 7/2017 | Agazzi | H04B 10/5059 |

OTHER PUBLICATIONS

International Search Report and Written Opinion dated Apr. 3, 2017 in International (PCT) Application No. PCT/US2016/067797.
Office Action dated Aug. 24, 2017 in U.S. Appl. No. 14/991,826.
Notice of Allowance dated Dec. 29, 2017 in U.S. Appl. No. 14/991,826.
International Preliminary Report on Patentability under Chapter II dated Mar. 27, 2018 in International (PCT) Application No. PCT/US2016/067797.
Office Action dated Jun. 20, 2018 in Australian Patent Application No. 2016385470 (3 pages).
Office Action dated Jul. 13, 2018 in Korean Patent Application No. 10-2018-7017126, and English translation thereof (8 pages).

\* cited by examiner

US 10,084,547 B2

IN-BAND OPTICAL INTERFERENCE MITIGATION FOR DIRECT-DETECTION OPTICAL COMMUNICATION SYSTEMS

RELATED APPLICATIONS

The present application is a divisional of, and claims the benefit of and priority to, co-pending U.S. patent application Ser. No. 14/991,826, titled "IN-BAND OPTICAL INTERFERENCE MITIGATION FOR DIRECT-DETECTION OPTICAL COMMUNICATION SYSTEMS," and filed on Jan. 8, 2016, the entire contents of which are hereby incorporated by reference.

TECHNICAL FIELD

This disclosure relates to the field of communication networks, and in particular to optical transceivers.

DESCRIPTION OF THE RELATED TECHNOLOGY

Communication systems, such as optical communication systems, include transmitters and receivers for communicating data over communication links. In some implementations, reflections caused by optical components such as connectors used in optical links can interfere with the original optical signals being transmitted between transmitters and receivers over the optical link.

SUMMARY

According to one aspect, the subject matter described in this disclosure relates to an optical receiver for receiving an optical signal. The receiver includes at least one photo detector, an analog to digital converter, and a digital signal processor. The at least one photo detector is configured to generate a first electrical analog receiver signal in response to receiving an optical signal, the optical signal including a modulated optical signal and a noise optical signal. The analog to digital converter is converter configured to receive the first electrical analog receiver signal and generate a corresponding first digital receiver signal. The digital signal processor is configured to subtract a data signal from the first digital receiver signal to generate an intermediate digital signal. The digital signal processor is further configured to determine a frequency offset and a bandwidth of an interference signal from the intermediate digital signal, the frequency offset of the interference signal indicative of the difference between the carrier frequencies of the modulated optical signal and the noise optical signal. The digital signal processor is also configured to filter the first digital receiver signal using a notch filter having a center frequency and bandwidth substantially equal to the frequency and bandwidth, respectively, of the interference signal to generate a filtered digital receiver signal.

According to another aspect, the subject matter described in this disclosure relates to an optical receiver for receiving an optical signal. The receiver includes at least one photo detector, an analog to digital converter and a digital signal processor. The at least one photo detector is configured to generate a first electrical analog receiver signal in response to receiving an optical signal, the optical signal including a modulated optical signal and a noise optical signal. The analog to digital converter is configured to receive the first electrical analog signal and generate a corresponding first digital receiver signal. The digital signal processor is configured to subtract a data signal from the first digital receiver signal to generate an intermediate digital signal. The digital signal processor is further configured to determine a frequency and a bandwidth of an interference signal from the intermediate digital signal, the frequency of the interference signal indicative of the difference between the carrier frequencies of the modulated optical signal and the noise optical signal. The digital signal processor is also configured to filter the intermediate digital signal using a filter having a frequency and bandwidth equal to the frequency and bandwidth, respectively, of the interference signal to generate an estimated interference signal. The digital signal processor is further configured to subtract the estimated interference signal from the first digital receiver signal to generate an interference suppressed digital receiver signal.

According to another aspect, the subject matter described in this disclosure relates to an optical transmitter including a laser configured to generate an optical signal having a carrier frequency. The transmitter further includes a modulator for modulating the carrier frequency with a data signal to generate a modulated optical signal. The transmitter also includes a laser tuner configured to tune the carrier frequency of the laser. The transmitter further includes a processor configured to receive a frequency offset of an interference signal from a remote receiver, the frequency offset of the interference signal indicative of the difference between the carrier frequency of the modulated optical signal and a noise optical signal. The processor is further configured to in response to receiving the frequency offset, dynamically compare the frequency offset with a bandwidth of the modulated optical signal; and based on the frequency offset being less than the bandwidth, control the laser tuner to tune the carrier frequency of the laser such that the received frequency offset is greater than the bandwidth.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

Figure 1:
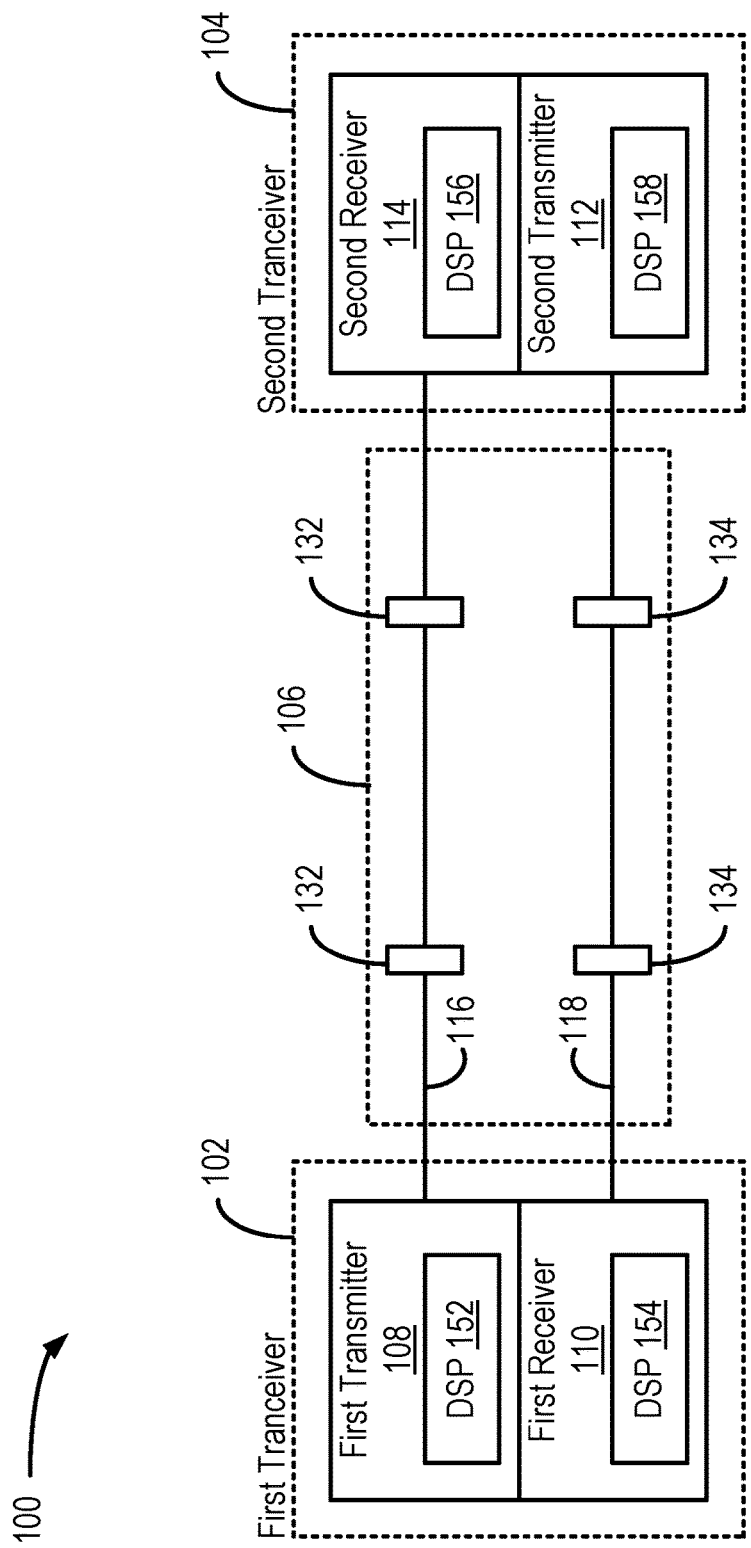
FIG. 1 shows an example communication system.

FIG. 1 shows an example communication system 100. In particular, the communication system 100 includes a first transceiver 102 communicating with a second transceiver 104 over a communication link 106. Each of the first transceiver 102 and the second transceiver 104 can be coupled to respective devices such as, network switches, computers, data-storage devices, network interface cards, host-bus adapters, etc. The first and the second transceivers 102 and 104 can provide communication between their respective devices. In some implementations, the communication link 106 can include wired or wireless communication links. In some implementations, the communication link 106 can include optical links.

The first transceiver 102 can include a first transmitter 108 and a first receiver 110. Similarly, the second transceiver 104 can include a second transmitter 112 and a second receiver 114. The first transmitter 108 can communicate with the second receiver 114 over a first optical link 116, while the second transmitter 112 can communicate with the first receiver 110 over a second optical link 118. In some implementations, the first transceiver 102 and the second transceiver 104 can communicate over out-of-band links. The first transmitter 108 and the second transmitter 112 can each include circuitry for processing and transmitting optical signals representative of the data being transmitted over the optical links 116 and 118 respectively. Similarly, the first receiver 110 and the second receiver 114 can include circuitry for receiving and processing the optical signals transmitted by the first transmitter 108 and the second transmitter 112, respectively, to regenerate the data. For example, the first transmitter 108 can include a digital signal processor (DSP) 152, the first receiver 110 can include a DSP 154, the second transmitter 112 can include a DSP 158, and the second receiver 114 can include a DSP 156. The DSPs in each of the transmitters and receivers can perform control and signal processing operations and can also communicate with various input and output optical and electrical ports at the receivers and the transmitters. In some implementations, each of the optical links 118 and 116 can include connectors 132 and 134 respectively. Each of the connectors 132 and 134 can extend the range of the optical links 116 and 118 by allowing end-to-end connections of two optical fibers.

Figure 2:
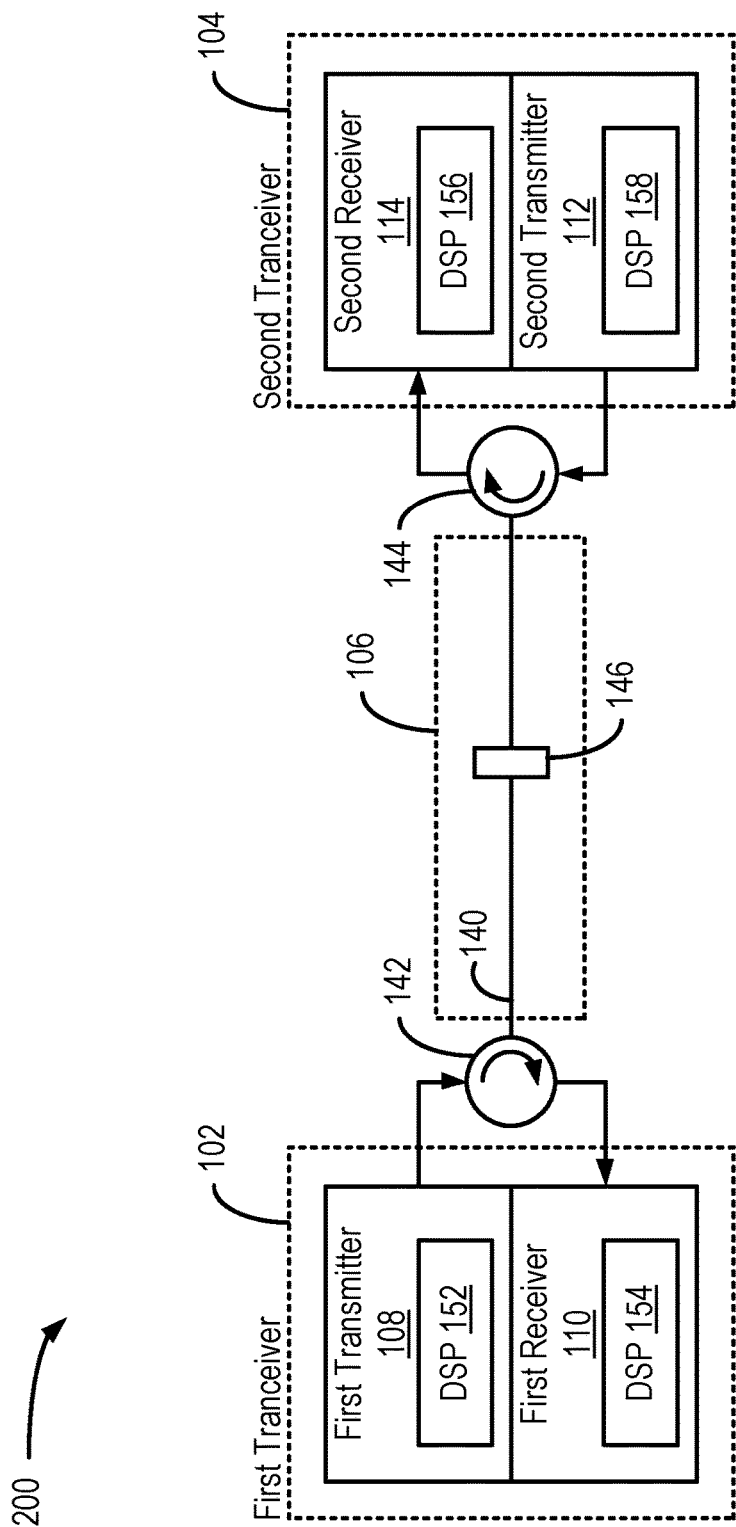
FIG. 2 shows another example communication system.

FIG. 2 shows another example communication system 200. The communication system 200 is similar to the communication system 100 in that, like the communication system 100, shown in FIG. 1, the communication system 200 also includes a first transceiver 102 and a second transceiver 104, where the first transceiver 102 incudes a first transmitter 108 and a first receiver 110, and the second transceiver 104 includes a second transmitter 112 and a second receiver 114. However, unlike the communication system 100, where the first and the second transceivers 102 and 104 communicate using separate optical links 116 and 118, the transceivers 102 and 104 in the communication system 200 communicate over a single optical link 140. To allow communication over the same optical link 140, the communication system can include a first circulator 142 and a second circulator 144. The first and second circulators 142 and 144 can separate optical signals that travel in opposite directions. Thus, an optical signal received over the optical link 140 at the first circulator 142 is directed towards the first receiver 110, while an optical signal received at the first circulator 142 from the first transmitter 108 is directed towards the optical link 140. In a similar manner the second circulator directs optical signals received over the optical link 140 towards the second receiver 114, and directs optical signals received from the second transmitter 112 towards the optical link 140. In some implementations, the optical link 140 can include a connector 146, similar to the optical connectors 132 and 134 shown in FIG. 1.

In some implementations, the optical communications between the first and the second transceivers shown in FIGS. 1 and 2 can suffer from unwanted interference. For example, referring to FIG. 1, the connectors 132 can cause reflections of optical signals transmitted over the first optical link 116. In particular, the connectors 132 can cause reflections of optical signals transmitted by the first transmitter 108 to the second receiver 114. Thus, the second receiver 114 not only receives the optical signal transmitted by the first transmitter 108, but also receives the reflected optical signals. Similarly, the first receiver 110 can receive the optical signal transmitted by the second transmitter 112 over the second optical link 118 in addition to reflected signals due to the connectors 134. In some implementations, signal interference caused by interfering signals resulting from reflections of an original signal transmitted over a unidirectional optical link is known as multi-path interference (MPI). As the reflected interfering signals are essentially a delayed copy of an original optical signal transmitted over the optical link, the interfering signals have a carrier frequency that is substantially equal to the original signal. As referred to herewith, noise optical signals can include unwanted optical signals, one example of which is the reflections of other optical signals or interfering optical signal.

The communication system 200, shown in FIG. 2, which includes a bi-directional optical link 140 also can suffer from interference from reflected signals. For example, the connector 146 may reflect a portion of the optical signal transmitted by the second transmitter 112 to the first receiver 110 back to the second receiver 114. Thus, the second receiver 114 not only receives the optical signal transmitted by the first transmitter 108 but also the reflected portion of the optical signal transmitted by the second transmitter 112. Similarly, the first receiver 110 can receive the reflected portion of the optical signal transmitted by the first transmitter 108 in addition to the optical signal transmitted by the second transmitter 112. In some implementations, the first transmitter 108 and the second transmitter 112 transmit optical signals at different carrier wavelengths. Thus, for example, the reflected signals received at the first receiver 110 would include an original optical signal transmitted by the second transmitter 114 and an interfering signal having a carrier wavelength similar to the carrier wavelength of the optical signal transmitted by the first transmitter 108. If the carrier wavelengths of the first and the second transmitter 108 and 112 are separated by less than the bandwidth of the optical signals transmitted by either of these transmitters, then the interfering reflected signals can cause in-band interference.

In some implementations, especially in direct-detection optical systems, utilizing higher order modulation techniques (e.g., PAM4), utilizing error correction techniques (such as forward-error-correction (FEC)) can reduce the impact of conventional additive Gaussian noise such as the thermal noise from transimpedance amplifiers. However, such technique is less effective in mitigating the effects of in-band interference, such as that resulting from reflecting optical signals discussed above in relation to FIGS. 1 and 2. The following discussion relates to techniques for mitigating in-band noise caused by interference between an original signal and reflecting signals having carrier frequencies that are substantially equal to the carrier frequency of the original signal or have carrier frequencies that are within the bandwidth of the original optical signal.

In some implementations, an intensity modulated optical signal (also referred to herein as the original optical signal) transmitted by a transmitter over an optical link can be represented by Equation (1):

$$E_T(t) = \sqrt{I_{0T}(1+a(t))} \cdot e^{j\omega_T t + j\theta(t)} \quad (1)$$

while the interfering optical signal received by a receiver in addition to the optical signal transmitted by the transmitter can be represented by Equation (2):

$$E_I(t) = \sqrt{I_{0I}(1+b(t))} \cdot e^{j\omega_I t + j\varphi(t)} \quad (2)$$

where $I_{0T}$ and $I_{0I}$ denote the average optical signal intensity of the originally modulated signal and the interfering signal received by the second receiver, respectively. a(t) and b(t) denote normalized A/C components of the optical and interfering signals, respectively. $\omega_T$ and $\theta(t)$ denote the carrier frequency and the phase of the original optical signal, while $\omega_I$ and $\varphi(t)$ denote the carrier frequency and the phase of the interfering signal. $\theta(t)$ and $\varphi(t)$ also constitute the modulation induced carrier phase change.

The terms $\sqrt{(1+a(t))}$ and $\sqrt{(1+b(t))}$ in Equations (1) and (2), respectively, can be further expanded using Tylor series resulting in Equations (3) and (4) shown below:

$$\sqrt{(1+a(t))} = 1 + f(a(t)) \quad (3)$$

$$\sqrt{(1+b(t))} = 1 + f(b(t)) \quad (4)$$

where f(a(t)) and f(b(t)) denote a function of a(t) and b(t), respectively. Substituting Equations (3) and (4) in Equations (1) and (2), respectively, results in Equations (5) and (6) shown below:

$$E_T(t) = \sqrt{I_{0T}} \cdot e^{j\omega_T t + j\theta(t)} + \sqrt{I_{0T}} \cdot f(a(t)) \cdot e^{j\omega_T t + j\theta(t)} \quad (5)$$

$$E_I(t) = \sqrt{I_{0I}} \cdot e^{j\omega_I t + j\varphi(t)} + \sqrt{I_{0I}} \cdot f(b(t)) \cdot e^{j\omega_I t + j\varphi(t)} \quad (6)$$

where the terms $\sqrt{I_{0T}} \cdot e^{j\omega_T t + j\theta(t)}$ and $\sqrt{I_{0T}} \cdot f(a(t)) \cdot e^{j\omega_T t + j\theta(t)}$ in Equation (5) represents the DC component and the AC component, respectively, of the intensity modulated optical signal. Similarly, the terms $\sqrt{I_{0I}} \cdot e^{j\omega_I t + j\varphi(t)}$ and $\sqrt{I_{0I}} \cdot f(b(t)) \cdot e^{j\omega_I t + j\varphi(t)}$ in Equation (6) represent the DC component and the AC component, respectively, of the interfering optical signal.

A photodetector at a receiver receives both the original intensity modulated optical signal represented by Equation (5) and the interfering signal represented by Equation (6). The photodetector will transform the optical signal and generate a corresponding electrical signal. Assuming that the state of polarization of the original optical signal and the interfering optical signal are aligned (worst-case assumption), and that the intensity of the interfering signal is significantly smaller than the intensity of the original optical signal, the electrical current generated by the photodetector at the receiver can be represented by the following Equation (7):

$$I(t) \approx RI_{0T}(1+a(t)) + I_{DCT-DCI}(t) + I_{DCT-ACI}(t) + I_{ACT-DCI}(t) + I_{ACT-ACI}(t) \quad (7)$$

where R denotes the responsivity of the photodetector. The first term $RI_{0T}(1+a(t))$ in Equation (7) is the current corresponding to the desired original optical signal, while the other four terms represent the currents corresponding to interference signals caused by interferences between the DC and AC components of the original optical signal and the interfering optical signal. Among the four interference terms, the term $I_{DCT-DCI}(t)$, which represents the current due to the interference between the DC components of the original optical signal and the interfering optical signal, exhibits the largest amplitude. Further the bandwidth of this term is relatively narrow, and is centered around a "beat frequency," which is the difference between the carrier frequency of the original optical signal and the carrier frequency of the interfering signal. Therefore, one approach to mitigate the effects of interference is to suppress the signal $I_{DCT-DCI}(t)$, the center frequency of which is the difference between the carrier frequencies of the original optical signal and the interfering signal, and the bandwidth of which is relatively narrow.

Figure 3:
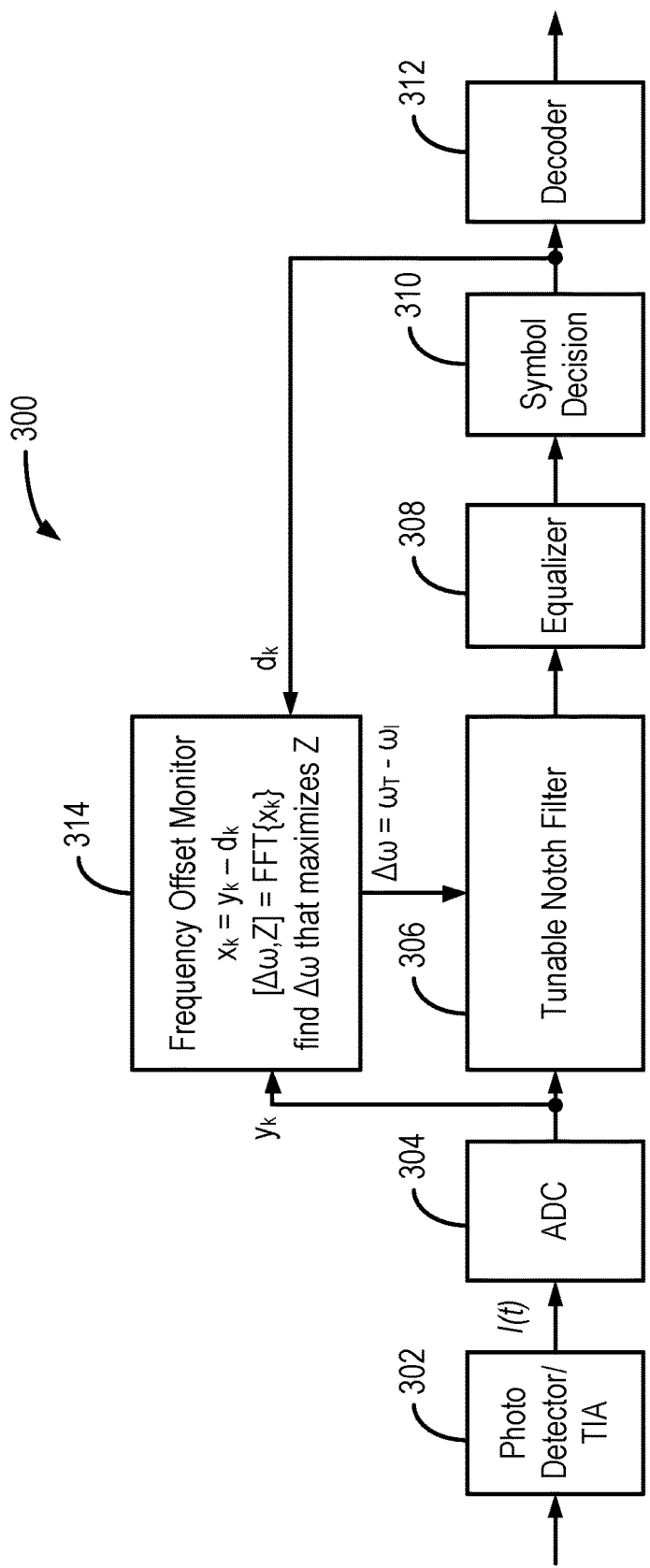
FIG. 3 shows a first receiver capable of mitigating interference in an optical signal.

FIG. 3 shows a first receiver 300 capable of mitigating interference in an optical signal. In particular, the first receiver 300 can be utilized to implement the first and second receivers 110 and 112 shown in FIGS. 1 and 2. The first receiver 300 is capable of automatically detecting an interference signal in the received optical signal and configuring a notch filter to filter the interference. The first receiver 300 includes a photodetector 302, an analog-to-digital converter (ADC) 304, a tunable notch filter 306, an equalizer 308, a symbol decision module 310, a decoder 312 and a frequency offset monitor 314. The photodetector 302 can be a semiconductor PIN diode configured to convert the intensity of the laser light incident on it into a corresponding electrical current. Photodiodes with spectral response range substantially equal to or greater than the bandwidth of the transmitted signal can be utilized. In some implementations, photodiodes with high sensitivity, and low dark current also can be utilized.

The optical signal received by the photodetector 302 not only includes the original intensity modulated optical signal transmitted by a transmitter, but also includes interfering optical signals that may be a result of one or more reflections along the optical link. The photodetector 302 converts the received optical signal into an analog electrical receiver signal. In some implementations, the photodetector 302 can generate an analog electrical current corresponding to the received optical signal. For example, the electrical current I(t) shown in Equation (7) above can represent the analog electrical receiver signal generated by the photodetector 302.

In some implementations, an amplifier can be utilized to amplify and/or transform the current I(t) generated by the photodetector 302. For example, a trans-impedance amplifier (TIA) can be utilized for amplifying and converting the electrical current I(t) into a voltage V(t). In some implementations, the TIA can be implemented using operational amplifiers.

The analog electrical receiver signal output of the photodetector 302 can be provided to the ADC 304 for conversion into a digital receiver signal. The ADC 304 converts the analog electrical receiver signal output by the photodetector 302 into a digital signal $y_k$, where $y_k$ denotes the digital value y for the $k^{th}$ sample of the analog electrical receiver signal. In some implementations, any one of direct-conversion ADCs, successive-approximation ADCs, ramp-compare ADCs, sigma-delta ADCs, etc., can be utilized for implementing the ADC 304. The digital receiver signal output by the ADC 304 can be provided to the frequency offset monitor 314 and the tunable notch filter 306.

The frequency offset monitor 314 processes the digital receiver signal to determine the center frequency for the tunable notch filter 306. In particular, the frequency offset monitor 314 determines the beat frequency $\Delta\omega$ of the interference optical signal, which is the difference between the carrier frequency $\omega_T$ of the original optical signal and the carrier frequency $\omega_I$ of the interfering optical signal. For determining the beat frequency $\Delta\omega$, the frequency offset monitor first removes data modulation from the digital receiver signal $y_k$. To remove the data modulation from the digital receiver signal $y_k$, the frequency offset monitor 314 subtracts the output $d_k$ of the symbol decision module 310 from the digital receiver signal $y_k$. The result of the subtraction is an intermediate signal $x_k$. The frequency offset monitor 314 then carries out a fast-Fourier-transform (FFT) analysis on the intermediate signal $x_k$ to determine the beat frequency $\Delta\omega$. In particular, the frequency offset monitor 314 equates the result of the FFT analysis to [$\Delta\omega$, Z], where Z denotes the amplitude spectrum, while $\Delta\omega$ denotes the beating frequency extracted from Z. The frequency offset monitor 314 then determines the value of $\Delta\omega$ that results in the maximum or peak value of Z. The $\Delta\omega$ that results in the maximum or peak value of Z is the beat frequency of the interference signal.

As discussed above, in instances where the interfering signal is a result of MPI, the carrier frequency $\omega_I$ of the interfering optical signal will be substantially equal to the carrier frequency $\omega_T$ of the original optical signal. As a result, the beat frequency $\Delta\omega$ in such instances is equal to zero. However, for in-band interference, where the interfering optical signal and the original optical signals are from different transmitters, the beat frequency $\Delta\omega$ will be a non-zero value. In some implementations, where interfering signal is a result of MPI, the frequency offset monitor 314 can be excluded and the tunable notch filter 306 can be replaced with low-pass filter in the first receiver 300 shown in FIG. 3. In some such implementations, the low-pass filter can be an analog low-pass filter, and can be positioned after the photodetector 302 and before the ADC 304. In some implementations, the analog low-pass filter, such as the one described above, can be utilized in communication systems that do not utilize an ADC at the receiver.

The frequency offset monitor 314 is capable of monitoring any changes in the beat frequency that may occur over time. For example, if the frequency of the laser diode used to generate the carrier frequency $\omega_T$ of the original optical signal drifts over time, the frequency offset monitor 314 tracks this drift in the carrier frequency to determine the correct value of the beat frequency $\Delta\omega$ of the interference optical signal Once the beat frequency $\Delta\omega$ is determined, the value of the beat frequency $\Delta\omega$ is communicated to the tunable notch filter 306. The tunable notch filter 306 provides high attenuation of an input signal within a narrow bandwidth around a center frequency while leaving frequency components of the input signal outside of the narrow bandwidth substantially unchanged. In some implementations, while the center frequency of the tunable notch filter is provided by the frequency offset monitor 314, the bandwidth of the tunable notch filter can be kept relatively constant. For example, in some implementations, where the linewidth of the laser generating the original optical signal is limited to a few MHz, and a modulation-induced chirp in the original optical signal is relatively small, a substantial portion of the interference signal will be limited to within tens of MHz of the beat frequency $\Delta\omega$. Therefore, the bandwidth of the tunable notch filter can be set of a few tens of MHz. For example, in some implementations, where a distributed feedback (DFB) laser (which can exhibit a linewidth of about 10 MHz) is utilized to generate the carrier frequency, and where an external modulator is used (which has a relatively small modulation-induced chirp), the bandwidth of the tunable notch filter 306 can be selected to be a few tens of MHz, such as about 10 MHz to about 90 MHz. The tunable notch filter 306 attenuates the frequency components of the digital receiver signal $y_k$ within the desired bandwidth around the beat frequency $\Delta\omega$, thereby substantially attenuating the interference signal.

The tunable notch filter 306 outputs a filtered digital receiver signal, which is fed to an equalizer 308. The equalizer 308 compensates for transmission-link impairments such as frequency-dependent phase and amplitude distortion, thereby reducing the effects of such impairments on symbol detection. In some implementations, the equalizer 308 also can reduce inter-symbol interferences. In some implementations, the equalizer 308 can carry out corrections for optical attenuation and/or chromatic dispersion on the filtered digital receiver signal. The equalizer 308 processes the filtered digital receiver signal and generates an equalized digital receiver signal, which is fed to the symbol decision module 310.

The symbol decision module 310 determines data symbols $d_k$ from the equalized digital receiver signal. The data symbols $d_k$ are fed back to the frequency offset monitor 314 and to the decoder 312, which decodes the actual bits represented by the symbols based on the encoding and modulation technique employed at the transmitter.

In some implementations, employing the tunable notch filter 306 to directly filter to attenuate the interference signal by directly filtering the incoming digital receiver signal may also result in the attenuation of the original data signal. The attenuation of the original data signal may, in turn, result in signal loss and an increase in the error rate of the data transmission. The following discussion relates to utilizing techniques that filter the unwanted interference signal without substantially affecting the original data signal.

Figure 4:
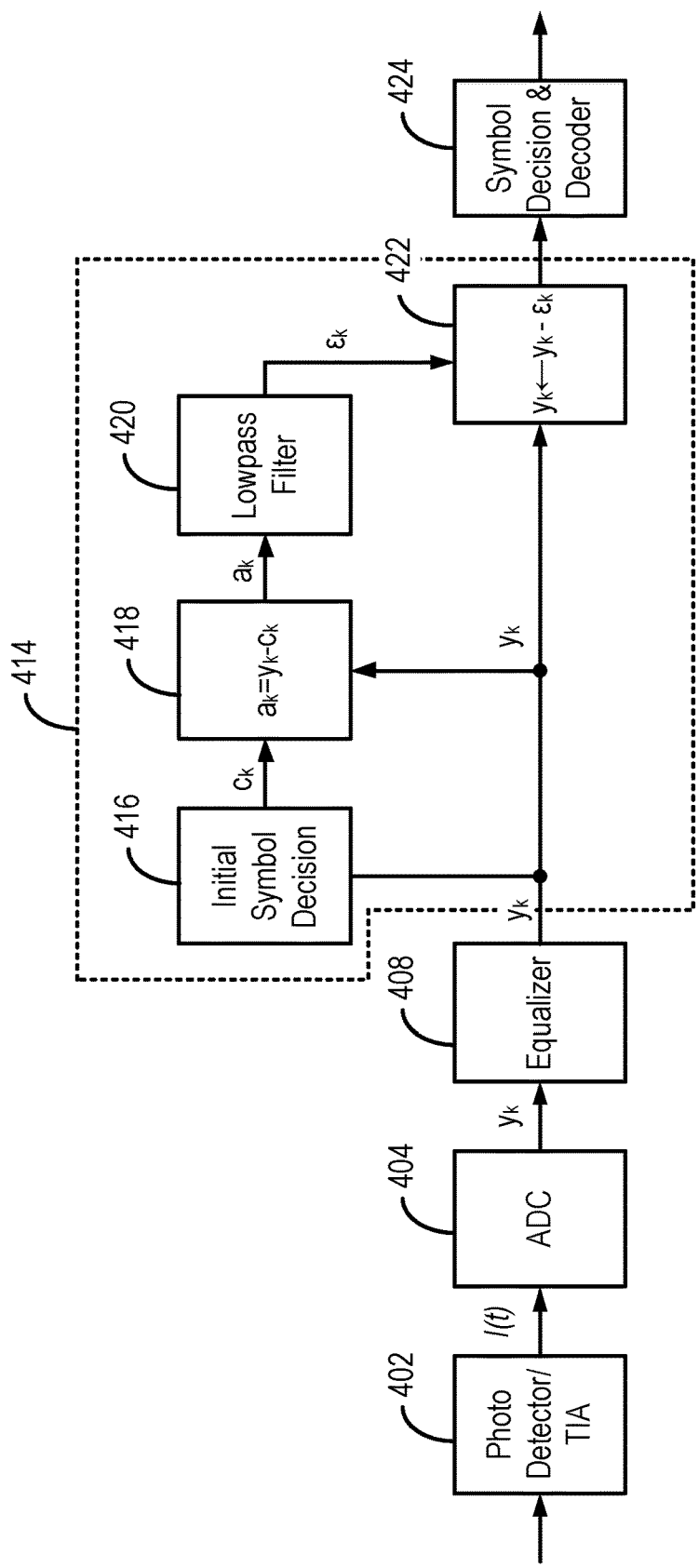
FIG. 4 shows a second receiver capable of mitigating interference in an optical signal.

FIG. 4 shows a second receiver 400 capable of mitigating interference in an optical signal. In particular, the second receiver 400 can be utilized for filtering MPI in a received optical signal. Unlike the first receiver 300, shown in FIG. 3, which directly filters the digital receiver signal to attenuate the interference signal, the second receiver 400 estimates the interference signal and then subtracts the estimate of the interference signal from the digital receiver signal. By avoiding directly filtering the digital receiver signal, the second receiver 400 avoids attenuating portions of the original data signal along with the interference signal.

The second receiver 400, similar to the first receiver 300, shown in FIG. 3, also includes a photo detector 402 and an ADC 404. The photodetector 402 and the ADC 404 can be similar to the photodetector 302 and the ADC 304, respectively, discussed above in relation to FIG. 3. The photodetector 402 receives an optical signal that includes an original optical signal and interfering optical signals that are a result of MPI, and have a carrier frequency that is substantially equal to the carrier frequency of the original optical signal. The photodetector 402 generates an analog receiver signal corresponding to the received optical signal. The analog receiver signal is digitized to a digital receiver signal by the ADC 404.

The second receiver 400 also includes an equalizer 408 that is similar to the equalizer 308 discussed above in relation to the first receiver shown in FIG. 3. However, unlike the equalizer 308 in the first receiver 300, which equalizes the filtered digital received signal, the equalizer 408 of the second receiver 400 equalizes the digital receiver signal output by the ADC 404 to generate an equalized digital receiver signal. Equalizing the digital receiver signal can reduce errors in the symbol decision process that is carried out in the MPI mitigation block 414 (discussed further below).

The second receiver 400 further includes an MPI mitigation block 414, which includes an initial symbol decision module 416, a data-removing module 418, a low-pass filter 420, and an MPI signal subtractor 422. The second receiver 400 also includes a final symbol decision and decoder block 424, which can be similar to the combination of the symbol decision module 310 and the decoder 312 discussed above in relation to the first receiver 300, shown in FIG. 3.

Referring again to the MPI mitigation block 414, initial symbol decision module 416 processes the equalized digital receiver signal $y_k$, output by the equalizer 408, to determine the data symbols $c_k$ included in the received signal. These data symbols $c_k$ are then subtracted from the digital receiver signal $y_k$ by the data-removing module 418 to generate an intermediate data signal. The intermediate data signal is then filtered by a low pass filter to generate an estimate $\varepsilon_k$ of the interference signal. In some implementations, the bandwidth of the low-pass filter can be based on the signal carrier phase noise (or linewidth) of the laser used to generate the carrier signal. For example, in some implementations, where a DFB laser and the external modulator are utilized, the linewidth of the signal carrier can be about 10 MHz to about 90 MHz. In some such implementations, the bandwidth of the low-pass filter also can be selected to be about 10 MHz to about 90 MHz. The estimate $\varepsilon_k$ of the interference signal is then subtracted from the digital receiver signal $y_k$ to generate an interference-suppressed digital receiver signal. The interference-suppressed digital receiver signal is then processed by the final symbol decision and decoder block 424 to extract the data included in the interference-suppressed digital receiver signal. As mentioned above, an estimate of the interference signal is subtracted from the digital receiver signal, instead of filtering the digital receiver signal. This approach alleviates the risk of filtering out portions of the original data signal along with the interference signal.

Figure 5:
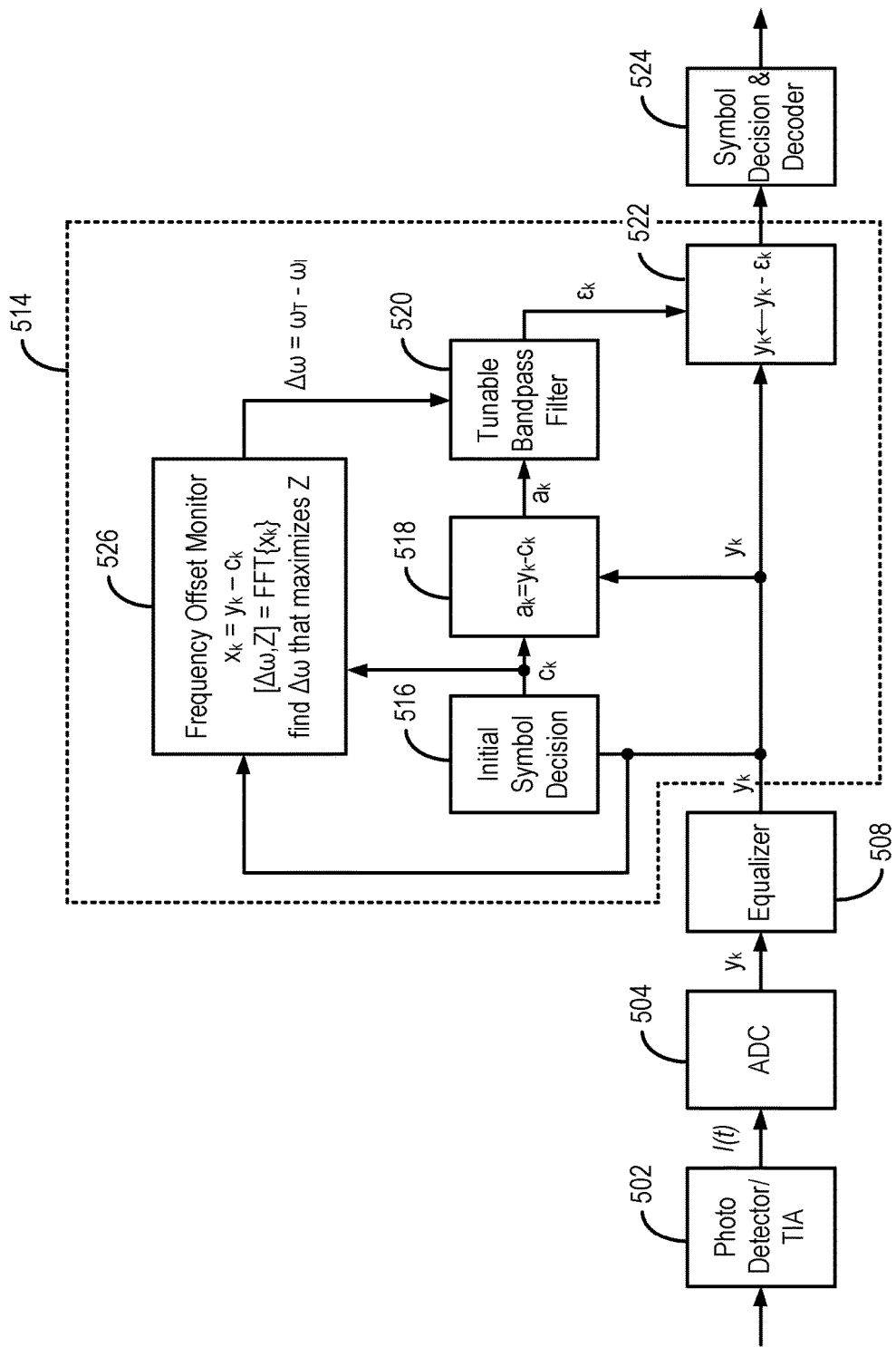
FIG. 5 shows a third receiver capable of mitigating interference in an optical signal.
Figure 6:
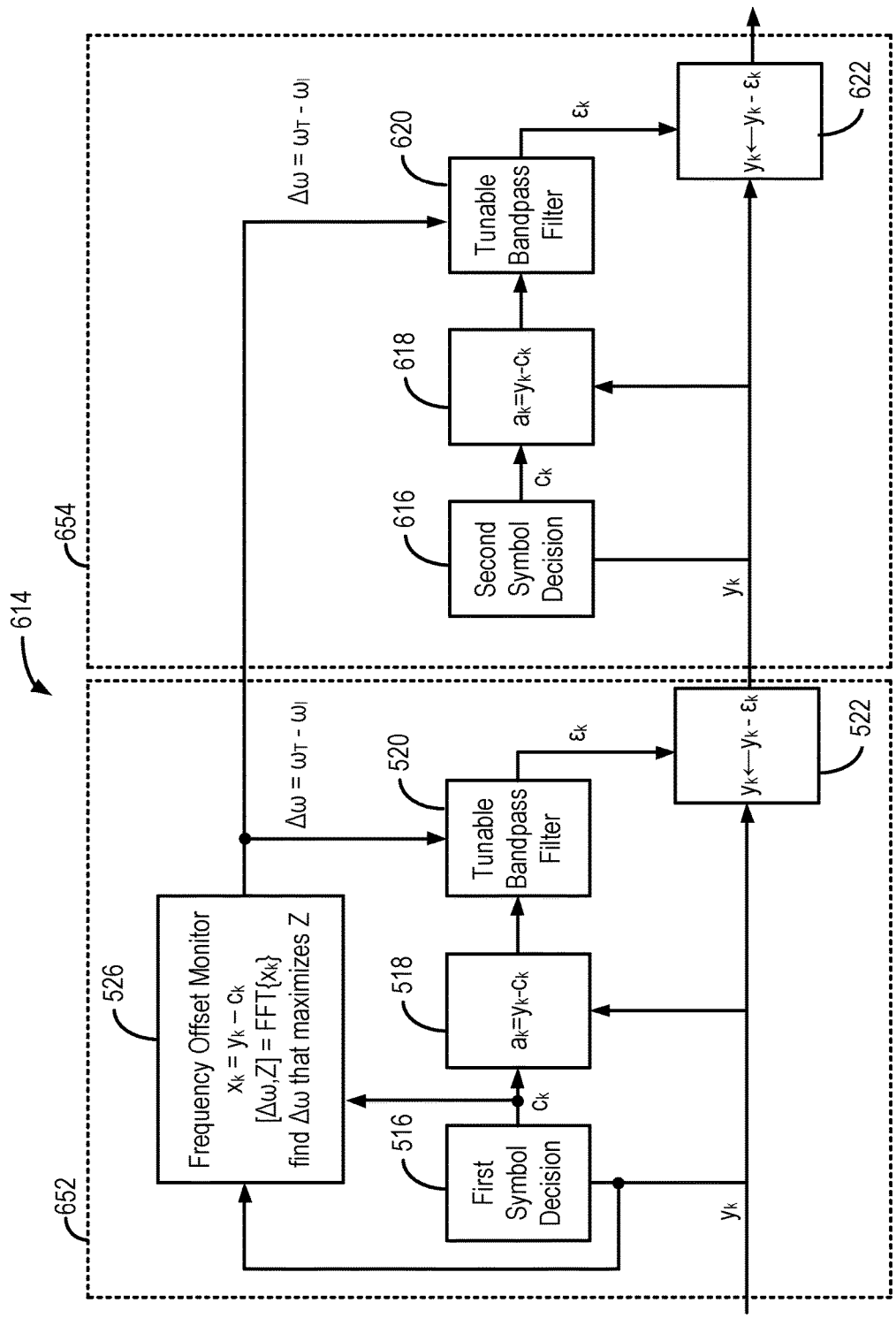
FIG. 6 shows another example interference mitigation block for use in the fourth receiver shown in FIG. 5.

While the second receiver 400, shown in FIG. 4, is directed to removing MPI from the received optical signal, the receivers discussed below in FIGS. 5 and 6 are directed to removing any (MPI or in-band) interference signals from the received optical signals.

FIG. 5 shows a third receiver 500 capable of mitigating interference in an optical signal. In particular, the third receiver 500 can be utilized for filtering MPI or in-band interference signals from the received optical signals. Similar to the second receiver 400, shown in FIG. 4, the third receiver 500 determines an estimate of the interference signal and subtracts the estimate of the interference signal from the digital receiver signal, thereby alleviating the need for filtering the interference signal directly from the digital receiver signal. Further, the third receiver 500 provides monitoring of the beat frequency between the carrier frequencies of the original optical signal and the interfering optical signal.

The third receiver 500 includes a photodetector 502, an ADC 504, an equalizer 508, an interference mitigation block 514, and a final symbol decision and decoder module 524. The interference mitigation block 514 includes in initial symbol decision module 516, a data-removing module 518, a tunable band-pass filter 520, a frequency offset monitor 526, and a signal subtractor 522. The photodetector 502, the ADC 504, the equalizer 508, the initial symbol decision module 516, the data-removing module 518, and the final symbol decision and decoder module 524 is similar to the photodetector 402, the ADC 404, the equalizer 408, the initial symbol decision module 416, the data-removing module 418, and the final symbol decision and decoder block 424, discussed above in relation to FIG. 4. Further, the frequency offset monitor 526 is similar to the frequency offset monitor 314 discussed above in relation to FIG. 3.

The interference mitigation block 514 utilizes the frequency offset monitor 526 to monitor and determine the beat frequency $\Delta\omega$ and uses this beat frequency to determine an estimate $\varepsilon_k$ of the interference signal. In particular, the frequency offset monitor 526 subtracts the data symbols, determined by the initial symbol decision module 416, from the digital receiver signal $y_k$ to generate an intermediate signal $a_k$. The frequency offset monitor 526 then carries out a FFT analysis on the intermediate signal to determine the beat frequency $\Delta\omega$. As discussed above, the beat frequency $\Delta\omega$ represents the center frequency of the interference signal. The center frequency of the tunable band-pass filter 520 is set to the beat frequency $\Delta\omega$ determined by the frequency offset monitor. The band-pass filter 520 filters the data-removed digital received signal generated by the data-removing module 518. As the center frequency and the bandwidth of the band-pass filter 520 are set to the estimated center frequency and the bandwidth of the interference signal, the output of the band-pass filter 520 is an estimate $\varepsilon_k$ of the interference signal. This estimate is then subtracted from the digital receiver signal $y_k$, to generate an interference suppressed digital receiver signal, which is processed by the symbol decision and decoder module 524 to generate data.

In some implementations, the accuracy of the beat frequency determined by the frequency offset monitor 526 can dependent on the errors in symbol decisions made by the initial symbol decision module 516. In some implementations, when the errors in symbol decisions are high, the accuracy of the beat frequency determined by the frequency offset monitor 526 may be unacceptably low. This, in turn, reduces the accuracy of the estimate of the interference signal and the effectiveness of the interference mitigation block 514 in removing the interference signal from the digital receiver signal. In some such implementations, an iterative approach to determining the beat frequency can be utilized, one example of which is discussed below in relation to FIG. 6.

FIG. 6 shows another example interference mitigation block 614 for use in the third receiver 500 shown in FIG. 5. In particular, the interference mitigation block 614 can be used instead of the interference mitigation block 514. The interference mitigation block 614 includes two sub-blocks: a first sub-block 652 and a second sub-block 654. The first sub-block 652 is identical to the interference mitigation block 514 shown in FIG. 5 and includes similar reference numbers. The second sub-block 654 includes a second symbol decision module 616, a second data-removing module 618, a second tunable band-pass filter 620 and a second signal subtractor 622. The second symbol decision module 616, the second data-removing module 618, the second tunable band-pass filter 620, and the second signal subtractor 622, can be similar to the symbol decision module 516, the data-removing module 518, the tunable band-pass filter 520, and the signal subtractor 522 of the first sub-block 652. The second sub-block 654, however, does not include a frequency offset monitor like the frequency offset monitor 526 in the first sub-block 652. Instead, the second tunable filter 620 receives the beat frequency value from the frequency offset monitor 526. The interference mitigation block 614 improves the accuracy of the interference signal estimate by repeating the symbol decision using the second symbol decision module 616. Thus, any errors in symbol determination introduced by the symbol decision module 516 can be alleviated. The estimate of the interference signal is re-determined based on the symbols detected by the second symbol decision module 616, and the second estimate is subtracted from the digital receiver signal. In some implementations, the second data-removing module 618 can subtract the data symbols $c_k$ output by the second symbol decision module 616 from the same optical signal $y_k$ received by the first sub-block 652 instead of from the interference suppressed digital receiver signal output by the first sub-block 652 as shown in FIG. 6. Similarly, the second signal subtractor 622 also can subtract the estimate of the interference signal generated by the second tunable band-pass filter 620 from the optical signal $y_k$ received by the first sub-block 652 instead of from the interference suppressed digital receiver signal output by the first sub-block 652.

In some implementations, the tunable notch filter 306 shown in FIG. 3 and the tunable band-pass filters 520 and 620 shown in FIGS. 5 and 6 can be implemented using infinite-impulse-response (IIR) digital filters. However, IIR filters may exhibit unstable operation. The following discussion relates to alternative approaches for implementing the tunable notch and band-pass filters that provide improved stability compared to IIR filters.

Figure 7:
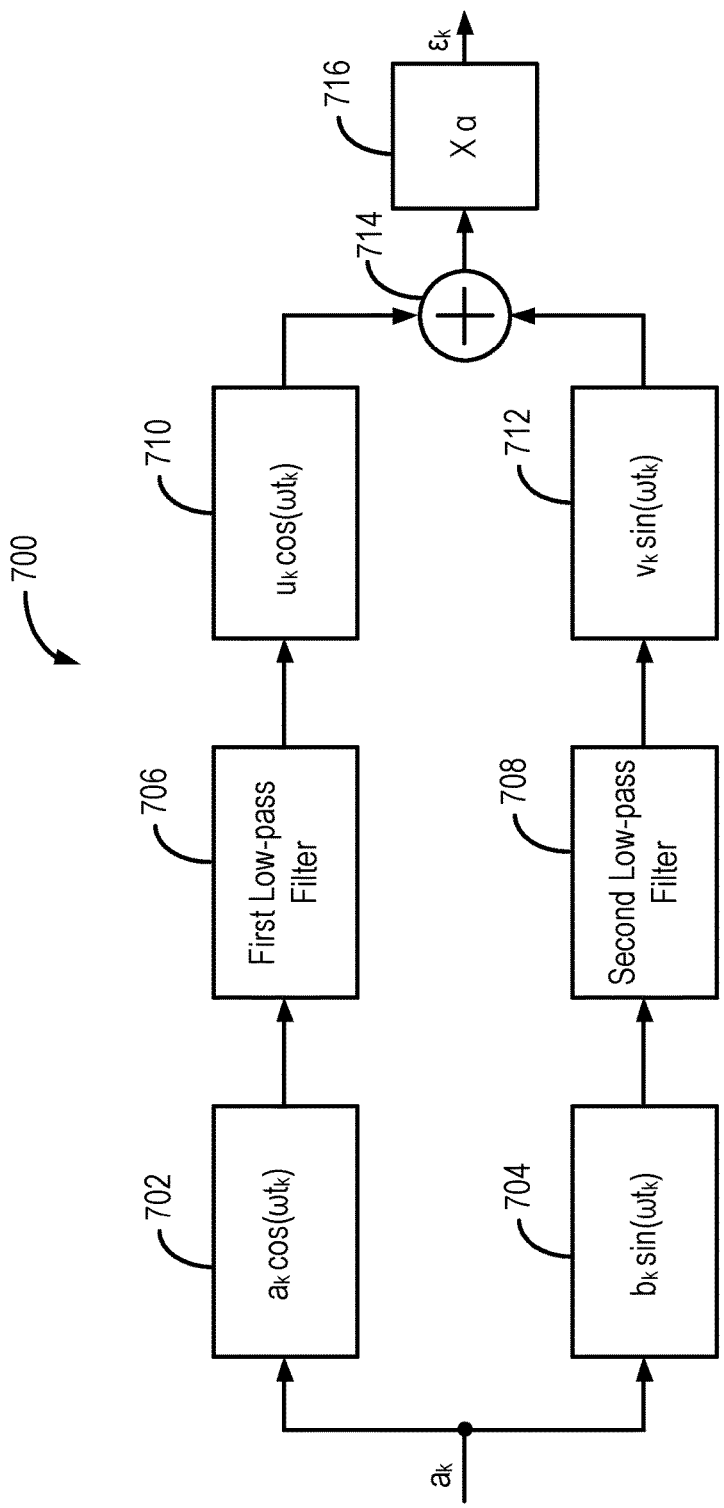
FIG. 7 shows a block diagram of an example band-pass filter.

FIG. 7 shows a block diagram of an example band-pass filter 700. In particular, the band-pass filter 700 can be utilized to implement the band-pass filters shown in FIGS. 5 and 6. The band-pass filter 700 includes a first cosine block 702 a first sine block 704, a first low-pass filter 706, a second low-pass filter 708, a second cosine block 710, a second sine block 712, an adder 714, and a scaling block 716. As discussed above in relation to FIGS. 5 and 6, the band-pass filter filters the data-removed digital receiver signal $a_k$ provided by the data-removing modules 518 and 618. The signal $a_k$ is provided to both the first cosine block 702 and the first sine block 704. The first cosine block 702 multiplies the signal $a_k$ with a $\cos(\omega t_k)$, while the first sine block 704 multiplies the signal $a_k$ with a $\sin(\omega t_k)$, where w denotes the center frequency (i.e., $\Delta\omega$) of the band-pass filter. Both the first cosine block 702 and the first sine block 704 shift the high frequency components of the signal $a_k$ into low frequency components. By shifting the high frequency components of the signal $a_k$ into low frequency components, low-pass filters, instead of band-pass filters can be utilized to filter the signal $a_k$. Utilizing low-pass filters instead of band-pass filters, can be advantageous, as low-pass filters, in comparison with band-pass filters, can be implemented more efficiently in the digital domain. The bandwidth of the first and second low-pass filters 706 and 708 can be selected to be substantially equal to the linewidth or bandwidth of the original carrier signal and the interfering carrier signal, which can be monitored by the frequency offset monitor, such as the frequency offset monitor 526 shown in FIG. 5. The low-pass filters 706 and 708 select the required spectral components of the interference signal to generate filtered signals $u_k$ and $v_k$, respectively. The filtered signals $u_k$ and $v_k$ are then up-converted or shifted to higher frequency components by the second cosine block 710 and the second sine block 712, respectively. The up-converted signals output by the second cosine block 710 and the second sine block 712 are summed at the adder 714, and scaled by a scaling factor $\alpha$ to generate the estimate $\varepsilon_k$ of the interference signal. In some implementations, the first and the second low-pass filters 706 and 708 can be implemented using a hardware-efficient moving-average filter. In some implementations, an example window size of the moving average filter can be about 64 samples.

In some implementations, the band-pass filter 700 shown in FIG. 7 also can be used in implementing a notch filter, such as the notch filter 306 shown in FIG. 3. In some such implementations, subtracting the output $\varepsilon_k$ of the band-pass filter 700 from the digital receiver signal $y_k$ is equivalent to filtering the digital receiver signal $y_k$ with a center frequency of $\omega$ and the same bandwidth as the band-pass filter 700.

Figure 8:
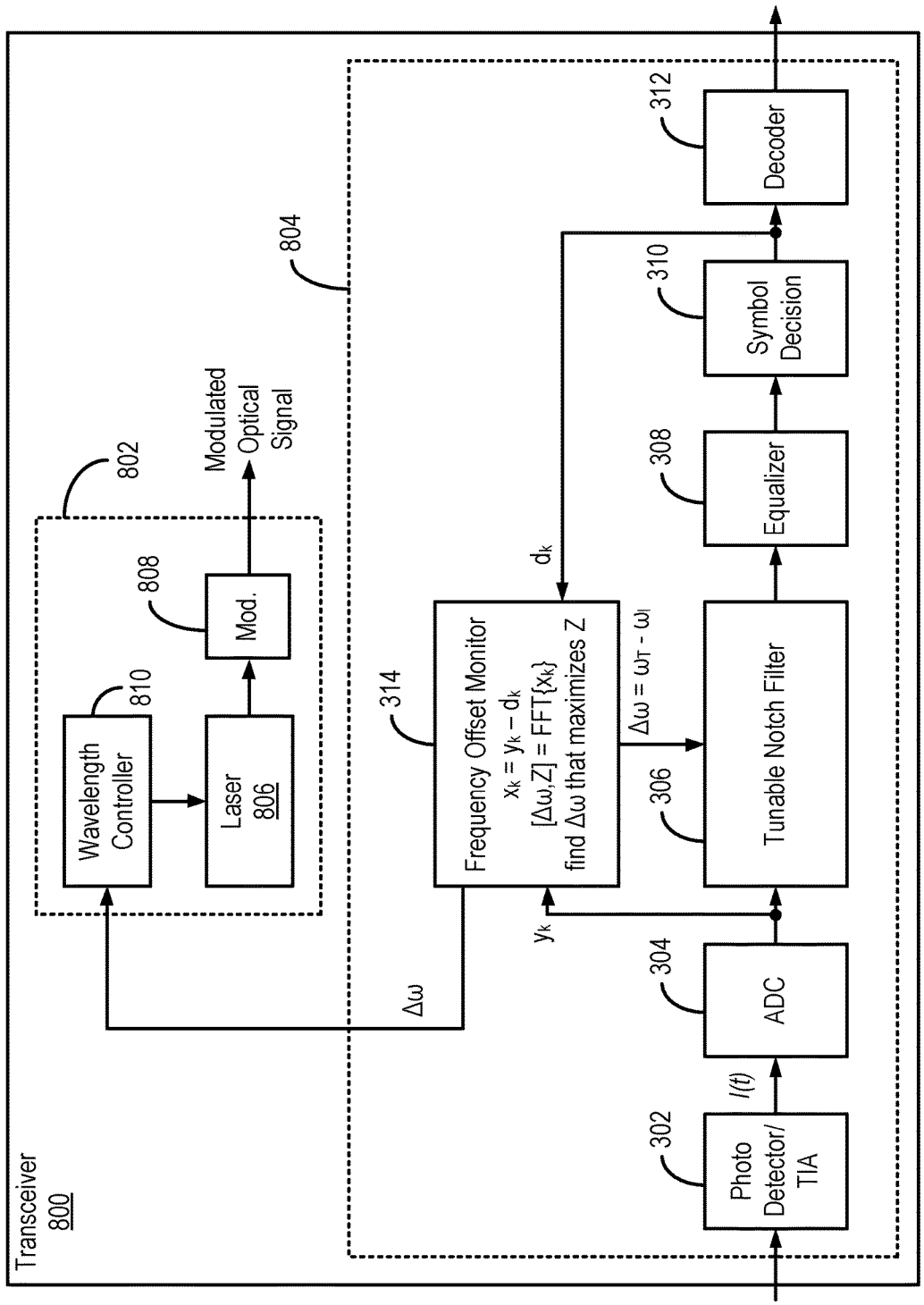
FIG. 8 shows another example transceiver for mitigating in-band interference
Like reference numbers and designations in the various drawings indicate like elements.

FIG. 8 shows another example transceiver 800 for mitigating in-band interference. In particular, the transceiver 800 can be utilized to implement one or both of the first transceiver 102 and the second transceiver 104 of the communication system 200 shown in FIG. 2. As discussed above in relation to FIG. 2, the first receiver 110 can receive an interfering signal that is a reflection of the optical signal transmitted by the first transmitter 108 to the second receiver 112. The reflection of the optical signal transmitted by the first transmitter 108 is caused by the connector 146 on the bi-directional optical link 140. In some implementations, the impact of the interference signal on the original optical signal is reduced if the difference between the carrier frequency of the original optical signal received by the first receiver 110 and the carrier frequency of the interfering signal (having the carrier frequency of the first transmitter 108), increases. In some implementations, if the difference between the carrier frequencies is greater than the bandwidth of the original optical signal received by the receiver 110, then the interference signal is no longer an in-band interference signal, and can therefore be ignored. The transceiver 800 shown in FIG. 8 is capable of changing the carrier frequency of the transmitter such that the carrier frequency of the resulting interfering signal is out-of-band of the original optical signal received by the receiver.

The transceiver 800 includes a transmitter 802 and a receiver 804. The transmitter 802 includes a laser 806 for generating an optical carrier signal at the transmitter 802, a modulator 808 for modulating data onto the optical carrier signal generated by the laser 806, and a wavelength controller 810 that can control the wavelength (or the carrier frequency) of the laser 806. The receiver 804 is similar to the receiver 300 discussed above in relation to FIG. 3, and includes the same components as that in the receiver 300. In particular, the receiver 804 includes the frequency offset monitor 314 that monitors the incoming optical signal and determines the beat frequency $\Delta\omega$. In some implementations, the beat frequency $\Delta\omega$ determined by the frequency offset monitor 314 is also communicated to the wavelength controller 810 of the transmitter 802. The wavelength controller 810 also can store in memory or receive from the receiver 804, the bandwidth of the optical signal received by the receiver 804. The wavelength controller 810 can then alter the carrier frequency of the laser 806 such that the beat frequency $\Delta\omega$ becomes greater than the bandwidth of the optical signal received by the receiver. As a result, the resulting interference signal will be out-of-band, thereby having minimal impact on the original optical signal received at the receiver 804.

In some implementations, the wavelength controller can be implemented using one or more of a microcontroller, a microprocessor, or an field-programmable-gate-array (FPGA). In some implementations, the wavelength controller can control a thermoelectric cooler (TEC) to adjust the operating temperature of the laser 806 to change its carrier frequency. In some implementations, for example, the wavelength of the laser 806 can change at a rate of about 0.1 nm/°

C. In some such implementations, a temperature change of about 2° C. can result in a change of about 34 GHz in the frequency of the laser 806.

As discussed above, the frequency offset monitor, such as the frequency offset monitor 314 shown in FIG. 3, can determine the beat frequency $\Delta\omega$ from the optical signal during normal data transmissions. In some other implementations, pilot training pulses also can be utilized for determining the beat frequency $\Delta\omega$. For example, referring to FIG. 1, the first transmitter 108 can transmit pilot training pulses which can be received at the second receiver 114 along with interfering optical signals. A frequency offset monitor, such as the frequency offset monitor 314 shown in FIG. 3, at the second receiver 114 can determine the beat frequency $\Delta\omega$ using the received pilot training pulses. The frequency offset monitors shown in FIGS. 5, 6, and 8 also can determine the beat frequency $\Delta\omega$ using received pilot training pulses. In some such implementations, the frequency offset monitor can continue monitoring the frequency offset after the pilot training pulses have ceased and data transmission has started.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. An optical transmitter comprising:
   a laser configured to generate an optical signal having a carrier frequency;
   a modulator for modulating the optical signal with a data signal to generate a modulated optical signal;
   a laser tuner configured to tune the carrier frequency of the optical signal; and
   a processor configured to:
      receive a frequency offset of an interference signal from a receiver, the frequency offset of the interference signal indicative of a difference between a received optical signal received at the receiver and a noise optical signal;
      in response to receiving the frequency offset, dynamically compare the frequency offset with a bandwidth of the modulated optical signal; and
      based on the frequency offset being less than the bandwidth of the modulated optical signal, control the laser tuner to tune the carrier frequency of the optical signal such that the received frequency offset is greater than the bandwidth of the modulated optical signal.

2. The optical transmitter of claim 1, wherein the laser tuner is a thermo-electric cooler configured to adjust a temperature of the laser in response to a control signal received from the processor.

3. The optical transmitter of claim 1, wherein the noise optical signal constitutes a reflected optical signal.

4. The optical transmitter of claim 1, wherein the noise optical signal constitutes a reflection of the modulated optical signal.

5. The optical transmitter of claim 1, wherein the frequency offset is indicative of a difference between a carrier frequency of the received optical signal and a carrier frequency of the noise optical signal.

6. The optical transmitter of claim 1, wherein the frequency offset is equal to zero.

7. The optical transmitter of claim 1, wherein the frequency offset is less than the bandwidth of the modulated optical signal.

8. The optical transmitter of claim 1, wherein the noise optical signal constitutes a reflection of the modulated optical signal over an optical link over which the modulated optical signal is transmitted.

9. The optical transmitter of claim 1, wherein the optical transmitter is a first optical transmitter, and the noise optical signal constitutes a reflection of a second optical signal transmitted by a second optical transmitter different from the first optical transmitter, the reflection occurring over a bi-directional optical link over which both the second optical signal and the modulated optical signal are transmitted.

10. A method comprising:
    generating, using a laser of an optical transmitter, an optical signal having a carrier frequency;
    modulating, using a modulator of the optical transmitter, the optical signal with a data signal to generate a modulated optical signal;
    tuning, using a laser tuner of the optical transmitter, the carrier frequency of the optical signal; and
    receiving, at a processor of the optical transmitter, a frequency offset of an interference signal from a receiver, the frequency offset of the interference signal indicative of a difference between a received optical signal received at the receiver and a noise optical signal;
    dynamically comparing, using the processor in response to receiving the frequency offset, the frequency offset with a bandwidth of the modulated optical signal; and
    controlling, by the processor based on the frequency offset being less than the bandwidth of the modulated optical signal, the laser tuner to tune the carrier frequency of the optical signal such that the received frequency offset is greater than the bandwidth of the modulated optical signal.

11. The method of claim 10, comprising:
    sending, by the processor, a control signal to the laser tuner, wherein the laser tuner is a thermo-electric cooler configured to adjust a temperature of the laser in response to the control signal received from the processor.

12. The method of claim 10, wherein the noise optical signal constitutes a reflected optical signal.

13. The method of claim 10, wherein the noise optical signal constitutes a reflection of the modulated optical signal.

14. The method of claim 10, wherein the frequency offset is indicative of a difference between a carrier frequency of the received optical signal and a carrier frequency of the noise optical signal.

15. The method of claim 10, wherein the frequency offset is equal to zero.

16. The method of claim 10, wherein the frequency offset is less than the bandwidth of the modulated optical signal.

17. The method of claim 10, wherein the noise optical signal constitutes a reflection of the modulated optical signal over an optical link over which the modulated optical signal is transmitted.

18. The method of claim 10, wherein the optical transmitter is a first optical transmitter, and the noise optical signal constitutes a reflection of a second optical signal transmitted by a second optical transmitter different from the first optical transmitter, the reflection occurring over a bi-directional optical link over which both the second optical signal and the modulated optical signal are transmitted.

* * * * *